United States Patent
Sasaki et al.

(10) Patent No.: US 7,193,816 B2
(45) Date of Patent: Mar. 20, 2007

(54) MAGNETIC HEAD FOR PERPENDICULAR MAGNETIC RECORDING AND METHOD OF MANUFACTURING SAME

(75) Inventors: Yoshitaka Sasaki, Milpitas, CA (US); Hiroyuki Itoh, Milpitas, CA (US); Dong-Hong Li, Milpitas, CA (US); Po-Kang Wang, Milpitas, CA (US); Lijie Guan, Milpitas, CA (US)

(73) Assignee: Headway Technologies, Milpitas, CA (US)

( * ) Notice: Subject to any disclaimer, the term of this patent is extended or adjusted under 35 U.S.C. 154(b) by 457 days.

(21) Appl. No.: 10/871,040

(22) Filed: Jun. 21, 2004

(65) Prior Publication Data

US 2005/0280937 A1 Dec. 22, 2005

(51) Int. Cl.
*G11B 5/147* (2006.01)
(52) U.S. Cl. ...................................... 360/126
(58) Field of Classification Search ............... None
See application file for complete search history.

(56) References Cited

U.S. PATENT DOCUMENTS

| | | | |
|---|---|---|---|
| 4,656,546 A | 4/1987 | Mallory | |
| 4,672,493 A | 6/1987 | Schewe | |
| 6,317,288 B1 * | 11/2001 | Sasaki | 360/126 |
| 6,477,005 B1 * | 11/2002 | Sasaki | 360/126 |
| 6,483,665 B1 * | 11/2002 | Sasaki | 360/126 |
| 6,504,675 B1 | 1/2003 | Shukh et al. | |
| 6,624,970 B1 * | 9/2003 | Sasaki | 360/126 |
| 6,643,095 B1 * | 11/2003 | Sasaki | 360/126 |
| 6,668,442 B2 * | 12/2003 | Sasaki | 29/603.14 |
| 6,680,815 B2 * | 1/2004 | Sasaki | 360/126 |
| 6,771,463 B2 * | 8/2004 | Kamijima | 360/123 |
| 6,940,689 B2 * | 9/2005 | Sasaki et al. | 360/123 |
| 7,002,776 B2 * | 2/2006 | Sasaki | 360/126 |
| 2003/0151850 A1 | 8/2003 | Nakamura et al. | |
| 2004/0240110 A1 | 12/2004 | Matono | |
| 2005/0105212 A1 * | 5/2005 | Sato | 360/123 |
| 2005/0190495 A1 * | 9/2005 | Lille | 360/128 |

FOREIGN PATENT DOCUMENTS

| | | |
|---|---|---|
| JP | A-2003-203311 | 7/2003 |
| JP | A-2003-242607 | 8/2003 |

* cited by examiner

*Primary Examiner*—David Davis
(74) *Attorney, Agent, or Firm*—Oliff & Berridge, PLC (57) ABSTRACT

A magnetic head comprises a pole layer, a gap layer, a shield layer, a nonmagnetic layer, and a coil. The shield layer incorporates: a first layer disposed on the gap layer; a second layer disposed on the first layer; a two-layered coupling layer disposed on a region of the pole layer where an opening of the gap layer is formed; and a third layer disposed to couple the second layer to the coupling layer. The first layer defines throat height TH. The nonmagnetic layer is disposed on a side of the first layer. The coil is disposed on the nonmagnetic layer on a side of the second layer.

16 Claims, 9 Drawing Sheets

MAGNETIC HEAD FOR PERPENDICULAR MAGNETIC RECORDING AND METHOD OF MANUFACTURING SAME

BACKGROUND OF THE INVENTION

1. Field of the Invention

The present invention relates to a magnetic head for perpendicular magnetic recording that is used for writing data on a recording medium by using a perpendicular magnetic recording system and to a method of manufacturing such a magnetic head.

2. Description of the Related Art

The recording systems of magnetic read/write devices include a longitudinal magnetic recording system wherein signals are magnetized in the direction along the surface of the recording medium (the longitudinal direction) and a perpendicular magnetic recording system wherein signals are magnetized in the direction orthogonal to the surface of the recording medium. It is known that the perpendicular magnetic recording system is harder to be affected by thermal fluctuation of the recording medium and capable of implementing higher linear recording density, compared to the longitudinal magnetic recording system.

Magnetic heads for perpendicular magnetic recording typically used have a layered structure comprising a reproducing (read) head having a magnetoresistive element (that may be hereinafter called an MR element) for reading and a recording (write) head having an induction-type electromagnetic transducer for writing. The write head comprises magnetic poles that produce a magnetic field in the direction orthogonal to the surface of the recording medium.

For the perpendicular magnetic recording system it is an improvement in recording medium and an improvement in write head that mainly contributes to an improvement in recording density. It is a reduction in track width and an improvement in writing characteristics that is particularly required for the write head to achieve higher recording density. On the other hand, if the track width is reduced, the writing characteristics, such as an overwrite property that is a parameter indicating an overwriting capability, are reduced. It is therefore required to achieve better writing characteristics as the track width is reduced.

A magnetic head used for a magnetic disk drive such as a hard disk drive is typically provided in a slider. The slider has a medium facing surface that faces toward a recording medium. This medium facing surface has an air-inflow-side end and an air-outflow-side end. The slider slightly flies over the surface of the recording medium by means of the airflow that comes from the air-inflow-side end into the space between the medium facing surface and the recording medium. The magnetic head is typically disposed near the air-outflow-side end of the medium facing surface of the slider. In a magnetic disk drive the magnetic head is aligned through the use of a rotary actuator, for example. In this case, the magnetic head moves over the recording medium along a circular orbit centered on the center of rotation of the rotary actuator. In such a magnetic disk drive, a tilt called a skew of the magnetic head is created with respect to the tangent of the circular track, in accordance with the position of the magnetic head across the tracks.

In a magnetic disk drive of the perpendicular magnetic recording system that exhibits a better capability of writing on a recording medium than the longitudinal magnetic recording system, in particular, if the above-mentioned skew is created, problems arise, such as a phenomenon in which data stored on an adjacent track is erased when data is written on a specific track (that is hereinafter called adjacent track erasing) or unwanted writing is performed on adjacent two tracks. To achieve higher recording density, it is required to suppress adjacent track erasing. Unwanted writing on adjacent two tracks affects detection of servo signals for alignment of the magnetic head and the signal-to-noise ratio of a read signal.

A technique is known for preventing the problems resulting from the skew as described above, as disclosed in the Published U.S. Patent Application No. 2003/0151850 A1, the Published Unexamined Japanese Patent Application 2003-203311, and the U.S. Pat. No. 6,504,675 B1, for example. According to this technique, the end face of the pole located in the medium facing surface is made to have a shape of trapezoid in which the side located backward in the direction of travel of the recording medium (that is, the side located closer to the air inflow end of the slider) is smaller than the other side.

As a magnetic head for perpendicular magnetic recording, a magnetic head comprising a magnetic pole and a shield is known, as disclosed in the U.S. Pat. No. 4,656,546, for example. In this magnetic head an end of the shield is located forward of an end of the pole along the direction of travel of the recording medium with a specific small space. Such a magnetic head will be hereinafter called a shield-type head. In the shield-type head the shield prevents a magnetic flux from reaching the recording medium, the flux being generated from the end of the pole and extending in directions except the direction orthogonal to the surface of the recording medium. The shield-type head achieves a further improvement in linear recording density.

The U.S. Pat. No. 4,672,493 discloses a magnetic head having a structure in which magnetic layers are provided forward and backward, respectively, in the direction of travel of the recording medium with respect to a middle magnetic layer to be the pole, and coils are disposed between the middle magnetic layer and the forward magnetic layer, and between the middle magnetic layer and the backward magnetic layer, respectively. This magnetic head is capable of increasing components orthogonal to the surface of the recording medium among components of the magnetic field generated from the medium-facing-surface-side end of the middle magnetic layer.

Figure 17:
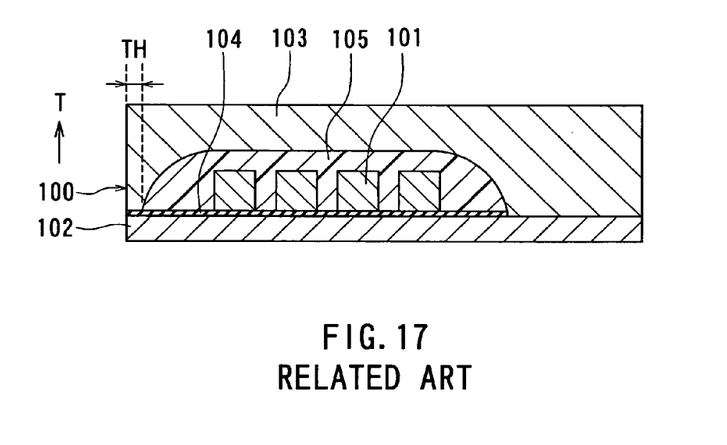
FIG. 17 is a cross-sectional view of the main part of a shield-type head.

Reference is now made to FIG. 17 to describe a basic configuration of the shield-type head. FIG. 17 is a cross-sectional view of the main part of an example of the shield-type head. The shield-type head comprises: a medium facing surface 100 that faces toward a recording medium; a coil 101 for generating a field corresponding to data to be written on the medium; a pole layer 102 having an end located in the medium facing surface 100, allowing a magnetic flux corresponding to the field generated by the coil 101 to pass, and generating a write magnetic field for writing the data on the medium by means of the perpendicular magnetic recording system; a shield layer 103 having an end located in the medium facing surface 100 and having a portion located away from the medium facing surface 100 and coupled to the pole layer 102; a gap layer 104 provided between the pole layer 102 and the shield layer 103; and an insulating layer 105 covering the coil 101.

In the medium facing surface 100, the end of the shield layer 103 is located forward of the end of the pole layer 102 along the direction T of travel of the recording medium with a specific space created by the thickness of the gap layer 104. At least part of the coil 101 is disposed between the pole layer 102 and the shield layer 103 and insulated from the pole layer 102 and the shield layer 103. The end of the pole layer 102 located in the medium facing surface 100 has a shape of trapezoid in which the side closer to the gap layer 104 is longer than the other side.

The coil 101 is made of a conductive material such as copper. The pole layer 102 and the shield layer 103 are made of a magnetic material. The gap layer 104 is made of an insulating material such as alumina ($Al_2O_3$). The insulating layer 105 is made of photoresist, for example.

In the head of FIG. 17 the gap layer 104 is disposed on the pole layer 102 and the coil 101 is disposed on the gap layer 104. The coil 101 is covered with the insulating layer 105. One of the ends of the insulating layer 105 closer to the medium facing surface 100 is located at a distance from the medium facing surface 100. In the region from the medium facing surface 100 to the end of the insulating layer 105 closer to the medium facing surface 100, the shield layer 103 faces toward the pole layer 102 with the gap layer 104 disposed in between. Throat height TH is the length (height) of the portions of the pole layer 102 and the shield layer 103 facing toward each other with the gap layer 104 disposed in between, the length being taken from the end closer to the medium facing surface 100 to the other end. Throat height TH affects the intensity and distribution of the field generated from the pole layer 102 in the medium facing surface 100.

In the shield-type head as shown in FIG. 17, for example, it is preferred to reduce throat height TH to improve the overwrite property. It is required that throat height TH be 0.1 to 0.3 micrometer (μm), for example. When such a small throat height TH is required, the following two problems arise in the head of FIG. 17.

The first problem of the head of FIG. 17 is that it is difficult to define the throat height TH with accuracy. That is, typically, the throat height TH is controlled by the depth to which the medium facing surface 100 is polished. When the medium facing surface 100 is polished, forces are applied to the portion of the shield layer 103 located between the insulating layer 105 and the medium facing surface 100: the force from the medium facing surface 100 to the insulating layer 105 and the force from the insulating layer 105 to the medium facing surface 100. In addition, the volume of the insulating layer 105 is much greater than the volume of the portion of the shield layer 103 located between the insulating layer 105 and the medium facing surface 100. Furthermore, the photoresist constituting the insulating layer 105 is relatively soft. Because of these factors, when the medium facing surface 100 is polished, the portion of the shield layer 103 located between the insulating layer 105 and the medium facing surface 100 varies, particularly when the throat height TH is small. As a result, variations of throat heights TH obtained after the medium facing surface 100 is polished occur.

The second problem of the head of FIG. 17 is that, when the head is operated, the end of the shield layer 103 located closer to the medium facing surface 100 is likely to protrude, which results from the heat generated by the coil 101. The reasons follow. The volume of the insulating layer 105 is much greater than the volume of the portion of the shield layer 103 located between the insulating layer 105 and the medium facing surface 100. Furthermore, the photoresist constituting the insulating layer 105 has a relatively high thermal expansion coefficient. Because of these factors, in the head of FIG. 17, the volume of expansion of the insulating layer 105 due to the heat generated by the coil 101 increases. As a result, the end of the shield layer 103 closer to the medium facing surface 100 is likely to protrude. This protrusion of the end of the shield layer 103 induces collision of the slider with the recording medium.

OBJECT AND SUMMARY OF THE INVENTION

It is an object of the invention to provide a magnetic head for perpendicular magnetic recording having a structure in which a pole layer faces toward a shield layer with a gap layer disposed in between, the head being capable of defining the throat height with accuracy and suppressing protrusion of the medium-facing-surface-side end of the shield layer due to the hear generated by the coil, and to provide a method of manufacturing such a magnetic head.

A magnetic head for perpendicular magnetic recording of the invention comprises: a medium facing surface that faces toward a recording medium; a coil for generating a magnetic field corresponding to data to be written on the recording medium; a pole layer having an end located in the medium facing surface, allowing a magnetic flux corresponding to the field generated by the coil to pass therethrough, and generating a write magnetic field for writing the data on the recording medium through the use of a perpendicular magnetic recording system; a shield layer having an end located in the medium facing surface, a portion of the shield layer away from the medium facing surface being coupled to the pole layer; and a gap layer made of a nonmagnetic material and provided between the pole layer and the shield layer. In the medium facing surface, the end of the shield layer is disposed forward of the end of the pole layer along a direction of travel of the recording medium with a specific space created by a thickness of the gap layer. At least part of the coil is disposed between the pole layer and the shield layer and insulated from the pole layer and the shield layer.

According to the magnetic head of the invention, the shield layer incorporates: a first layer disposed adjacent to the gap layer; and a second layer disposed on a side of the first layer opposite to the gap layer. The first layer has a first end located in the medium facing surface and a second end located opposite to the first end, the second end defining a throat height. The magnetic head of the invention further comprises a nonmagnetic layer made of a nonmagnetic material and disposed on a side of the first layer. The at least part of the coil is disposed in a region of the nonmagnetic layer that is opposite to the pole layer and farther from the pole layer than a surface of the first layer opposite to the pole layer.

According to the magnetic head of the invention, the second end of the first layer of the shield layer defines the throat height. The nonmagnetic layer is disposed on a side of the first layer, and the at least part of the coil is disposed in a region of the nonmagnetic layer that is opposite to the pole layer and farther from the pole layer than the surface of the first layer opposite to the pole layer. Therefore, according to the invention, no coil or insulating layer covering a coil exists on a side of the first layer.

A method of manufacturing the magnetic head of the invention comprises the steps of: forming the pole layer; forming the gap layer on the pole layer; forming the first layer on the gap layer; forming the nonmagnetic layer made of a nonmagnetic material and disposed on a side of the first layer; forming the coil such that the at least part of the coil is disposed in a region of the nonmagnetic layer that is opposite to the pole layer and farther from the pole layer than a surface of the first layer opposite to the pole layer; and forming the second layer on the first layer.

According to the magnetic head or the method of manufacturing the same of the invention, the end of the pole layer located in the medium facing surface may have a shape of trapezoid in which a side closer to the gap layer is longer than the other side.

According to the magnetic head or the method of the invention, the nonmagnetic layer may be made of an inorganic insulating material.

According to the magnetic head or the method of the invention, the second layer may be disposed between the medium facing surface and the at least part of the coil, the magnetic head may further comprise an insulating layer disposed around the at least part of the coil, each of the second layer, the at least part of the coil, and the insulating layer may have a flattened surface that is located opposite to the pole layer, and the shield layer may further incorporate a third layer that is connected to the second layer and located on a side of the at least part of the coil opposite to the nonmagnetic layer. In this case, the nonmagnetic layer preferably has a thermal expansion coefficient lower than that of the insulating layer.

According to the magnetic head or the method of the invention, the magnetic head may further comprise an insulating layer covering the at least part of the coil, wherein the second layer includes a portion located on a side of the at least part of the coil opposite to the pole layer. In this case, the nonmagnetic layer preferably has a thermal expansion coefficient smaller than that of the insulating layer.

According to the magnetic head or the method of the invention, the distance between an end closer to the medium facing surface and the other end of a portion of the second layer, the portion located between the medium facing surface and the at least part of the coil, may increase as the distance from the first layer increases.

According to the magnetic head or the method of the invention, the second end of the first layer of the shield layer defines the throat height. The nonmagnetic layer is disposed on a side of the first layer, and the at least part of the coil is disposed in a region of the nonmagnetic layer that is opposite to the pole layer and farther from the pole layer than the surface of the first layer opposite to the pole layer. Therefore, according to the invention, no coil or insulating layer covering a coil exists on a side of the first layer. As a result, according to the invention, it is possible to define the throat height with accuracy and to suppress protrusion of an end of the shield layer closer to the medium facing surface resulting from the heat generated by the coil.

Other and further objects, features and advantages of the invention will appear more fully from the following description.

DETAILED DESCRIPTION OF THE PREFERRED EMBODIMENTS

First Embodiment

Figure 1:
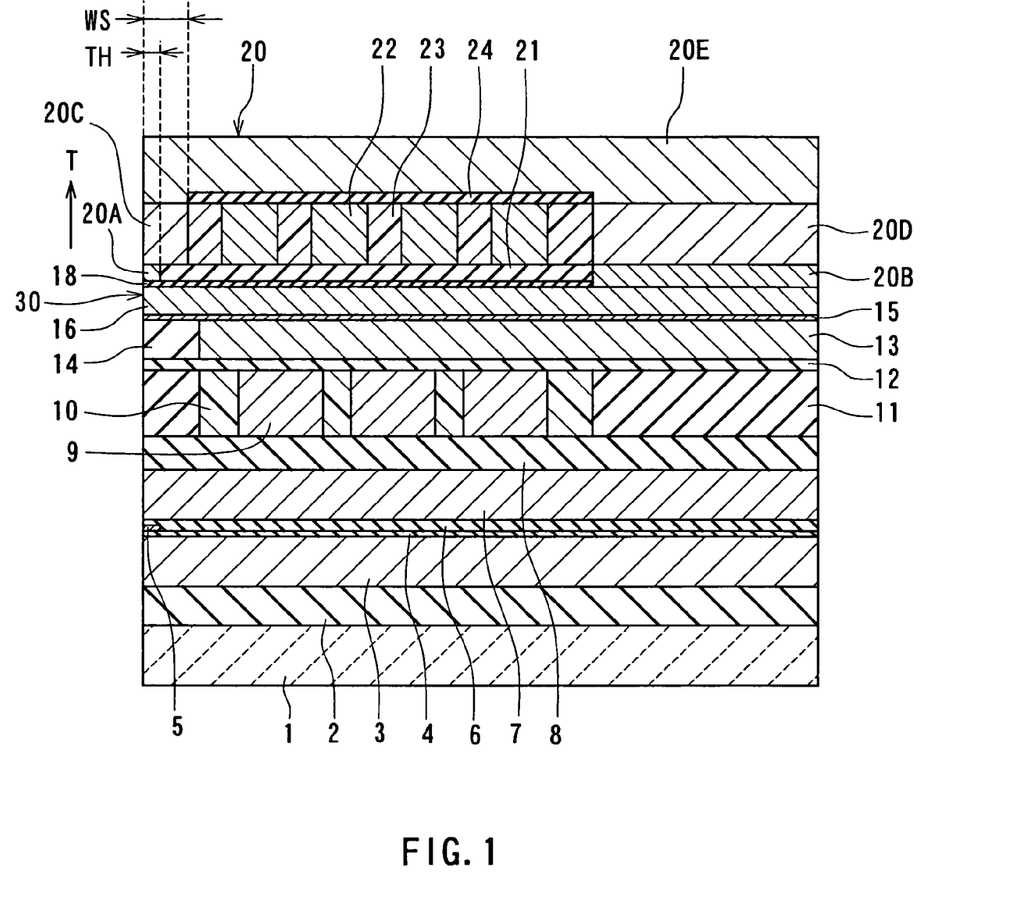
FIG. 1 is a cross-sectional view for illustrating the configuration of a magnetic head of a first embodiment of the invention.
Figure 2:
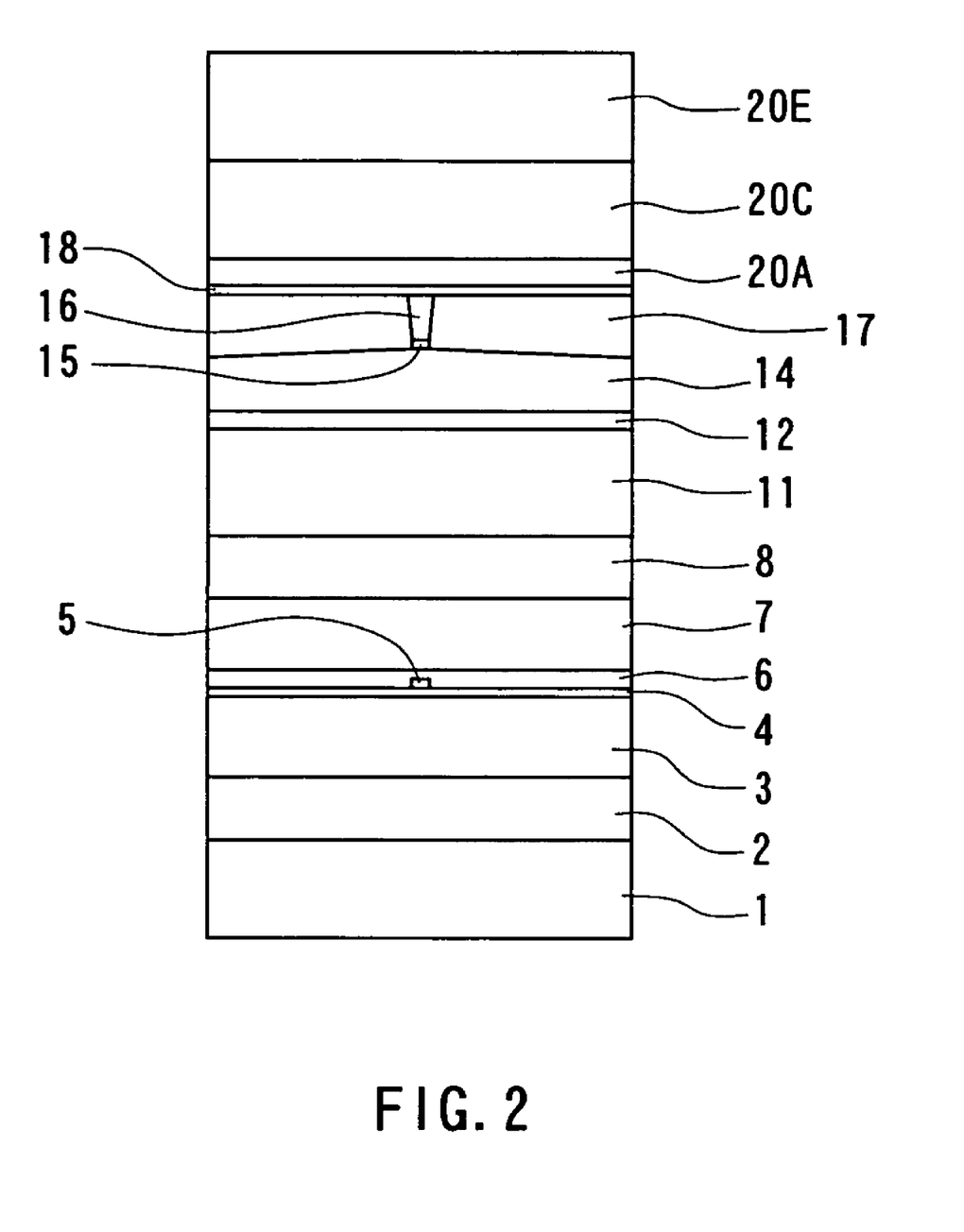
FIG. 2 is a front view of the medium facing surface of the magnetic head of FIG. 1.

Preferred embodiments of the invention will now be described in detail with reference to the accompanying drawings. Reference is now made to FIG. 1 and FIG. 2 to describe the configuration of a magnetic head for perpendicular magnetic recording of a first embodiment of the invention. FIG. 1 is a cross-sectional view for illustrating the configuration of the magnetic head of the embodiment. FIG. 1 illustrates a cross section orthogonal to the medium facing surface and a surface of a substrate. The arrow indicated with T in FIG. 1 shows the direction of travel of a recording medium. FIG. 2 is a front view of the medium facing surface of the magnetic head of the embodiment.

As shown in FIG. 1 and FIG. 2, the magnetic head for perpendicular magnetic recording (hereinafter simply called the magnetic head) of the embodiment comprises: a substrate 1 made of a ceramic such as aluminum oxide and titanium carbide ($Al_2O_3$—TiC); an insulating layer 2 made of an insulating material such as alumina ($Al_2O_3$) and disposed on the substrate 1; a bottom shield layer 3 made of a magnetic material and disposed on the insulating layer 2; a bottom shield gap film 4 that is an insulating film disposed on the bottom shield layer 3; a magnetoresistive (MR) element 5 as a read element disposed on the bottom shield gap film 4; a top shield gap film 6 that is an insulating film disposed on the MR element 5; and a top shield layer 7 made of a magnetic material and disposed on the top shield gap film 6. The portion from the bottom shield layer 3 to the top shield layer 7 make up the read head.

The MR element 5 has an end that is located in the medium facing surface 30 that faces toward a recording medium. The MR element 5 may be an element made of a magneto-sensitive film that exhibits a magnetoresistive effect, such as an anisotropic magnetoresistive (AMR) element, a giant magnetoresistive (GMR) element, or a tunnel magnetoresistive (TMR) element.

The magnetic head further comprises: an insulating layer 8 made of an insulating material and disposed on the top shield layer 7; a coil 9 formed on the insulating layer 8; an insulating layer 10 made of an insulating material and disposed around the coil 9 and in the space between adjacent ones of the turns of the coil 9; and an insulating layer 11 made of an insulating material and disposed around the insulating layer 10. The coil 9 is flat-whorl-shaped. The coil 9 and the insulating layers 10 and 11 have flattened top surfaces. The insulating layers 8 and 11 are made of alumina, for example. The insulating layer 10 is made of photoresist, for example. The coil 9 is made of a conductive material such as copper.

The magnetic head further comprises: an insulating layer 12 made of an insulating material and disposed on the flattened top surfaces of the coil 9 and the insulating layers 10 and 11; a yoke layer 13 made of a magnetic material and disposed on the insulating layer 12; and an insulating layer 14 made of an insulating material and disposed around the yoke layer 13. The yoke layer 13 and the insulating layer 14 have flattened top surfaces. The insulating layers 12 and 14 are made of alumina, for example. The yoke layer 13 is made of CoNiFe, for example.

The magnetic head further comprises: an electrode film 15 disposed on the flattened top surfaces of the yoke layer 13 and the insulating layer 14; a pole layer 16 disposed on the electrode film 15; and a nonmagnetic layer 17 made of a nonmagnetic material and disposed around the electrode film 15 and the pole layer 16. Each of the electrode film 15 and the pole layer 16 is made of a magnetic material. The electrode film 15 is made of NiFe, for example. The pole layer 16 is made of a magnetic material containing Co and Fe, for example. In the embodiment the pole layer 16 is made of CoFe having a saturation flux density of 2.3 to 2.4 T by way of example. The nonmagnetic layer 17 is made of alumina, for example. The pole layer 16 and the nonmagnetic layer 17 have flattened top surfaces.

The magnetic head further comprises a gap layer 18 disposed on the flattened top surfaces of the pole layer 16 and the nonmagnetic layer 17. The gap layer 18 has an opening located at a distance from the medium facing surface 30. The gap layer 18 may be made of an insulating material such as alumina or a nonmagnetic metal material such as Ru, NiCu, Ta, W or LIB.

The magnetic head further comprises a shield layer 20. The shield layer 20 has: a first layer 20A disposed on the gap layer 18; a second layer 20C disposed on the first layer 20A; a coupling layer 20B disposed on a portion of the pole layer 16 where the opening of the gap layer 18 is formed; a coupling layer 20D disposed on the coupling layer 20B; and a third layer 20E disposed to couple the second layer 20C to the coupling layer 20D. The first layer 20A, the second layer 20C, the coupling layers 20B and 20D, and the third layer 20E are made of CoNiFe, for example.

The magnetic head further comprises a nonmagnetic layer 21 made of a nonmagnetic material and disposed around the coupling layer 20B. A portion of the nonmagnetic layer 21 is disposed on a side of the first layer 20A. The nonmagnetic layer 21 is made of an inorganic insulating material such as alumina or coating glass. Alternatively, the nonmagnetic layer 21 may be made up of a layer of a nonmagnetic metal material and a layer of an insulating material disposed thereon. In this case, the nonmagnetic metal material may be a refractory metal such as Ta, Mo, Nb, W, Cr, Ru, Cu or Ni.

The magnetic head further comprises: a coil 22 disposed on the nonmagnetic layer 21; an insulating layer 23 disposed around the coil 22 and in the space between adjacent ones of the turns of the coil 22; and an insulating layer 24 disposed on the coil 22 and the insulating layer 23. The coil 22 is flat-whorl-shaped. A portion of the coil 22 passes between the second layer 20C and the coupling layer 20D. The coil 22 is made of a conductive material such as copper. The second layer 20C, the coupling layer 20D, the coil 22 and the insulating layer 23 have flattened top surfaces. The insulating layer 23 is made of photoresist, for example. The insulating layer 24 is made of alumina, for example.

The portion from the coil 9 to the third layer 20E of the shield layer 20 make up the write head. Although not shown, the magnetic head further comprises a protection layer for covering the shield layer 20.

As described so far, the magnetic head of the embodiment comprises the medium facing surface 30 that faces toward a recording medium, the read head, and the write head. The read head is disposed backward in the direction T of travel of the recording medium (that is, on the air-inflow-end side of the slider). The write head is disposed forward in the direction T of travel of the recording medium (that is, on the air-outflow-end side of the slider).

The read head comprises the MR element 5 as the read element, and the bottom shield layer 3 and the top shield layer 7 for shielding the MR element 5. Portions of the bottom shield layer 3 and the top shield layer 7 that are located on a side of the medium facing surface 30 are opposed to each other, the MR element 5 being placed between these portions. The read head further comprises: the bottom shield gap film 4 disposed between the MR element 5 and the bottom shield layer 3; and the top shield gap film 6 disposed between the MR element 5 and the top shield layer 7.

The write head comprises the coil 9, the yoke layer 13, the pole layer 16, the gap layer 18, the shield layer 20, the nonmagnetic layer 21, the coil 22, and the insulating layers 23 and 24. The coils 9 and 22 generate a magnetic field corresponding to data to be written on the recording medium. The coil 9 is not a component requisite for the write head and may be omitted.

The pole layer 16 has an end located in the medium facing surface 30 and allows the magnetic flux corresponding to the field generated by the coil 22 to pass therethrough and generates a write magnetic field for writing the data on the medium by using the perpendicular magnetic recording system.

The shield layer 20 has an end located in the medium facing surface 30, and has a portion located away from the medium facing surface 30 and coupled to the pole layer 16. The gap layer 18 is made of a nonmagnetic material and provided between the pole layer 16 and the shield layer 20.

In the medium facing surface 30, the end of the shield layer 20 is disposed forward of the end of the pole layer 16 along the direction T of travel of the recording medium with a specific space created by the thickness of the gap layer 18. At least part of the coil 22 is disposed between the pole layer 16 and the shield layer 20 and insulated from the pole layer 16 and the shield layer 20.

The shield layer 20 has: the first layer 20A disposed adjacent to the gap layer 18; the second layer 20C disposed on a side of the first layer 20A farther from the gap layer 18; the coupling layers 20B and the 20D disposed on the portion of the pole layer 16 where the opening of the gap layer 18 is formed; and the third layer 20E disposed to couple the second layer 20C to the coupling layer 20D. The second layer 20C is disposed between the medium facing surface 30 and at least part of the coil 22.

The insulating layer 23 is disposed between adjacent ones of the turns of the coil 22 and around the at least part of the coil 22. Each of the second layer 20C, the coupling layer 20D, the coil 22 and the insulating layer 23 has a flattened surface that is located farther from the pole layer 16 than the other surface. The insulating layer 24 has a thickness of 0.2 µm, for example.

Figure 3:
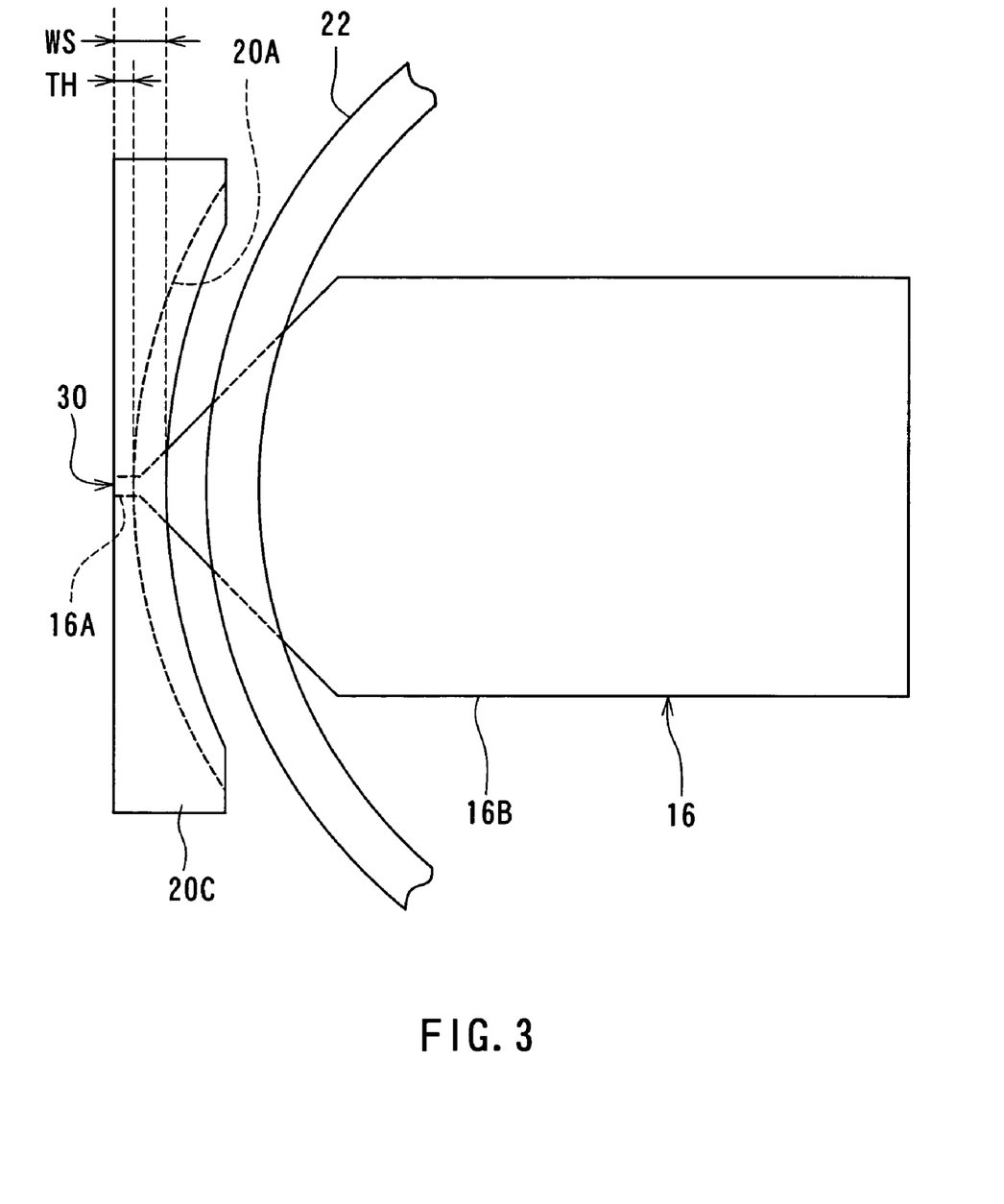
FIG. 3 is a top view of the main part of the magnetic head of FIG. 1.

FIG. 3 is a top view illustrating the pole layer 16, the first layer 20A, the second layer 20C and a portion of the coil 22. As shown in FIG. 3, the pole layer 16 incorporates a track width defining portion 16A and a wide portion 16B. The track width defining portion 16A has an end located in the medium facing surface 30 and has a uniform width equal to the track width. The wide portion 16B is coupled to the other end of the track width defining portion 16A and has a width greater than the width of the track width defining portion 16A. The wide portion 16B is equal in width to the track width defining portion 16A at the interface with the track width defining portion 16A, and gradually increases in width as the distance from the medium facing surface 30 increases and then maintains a specific width to the end of the wide portion 16B.

As shown in FIG. 2, the end of the pole layer 16 located in the medium facing surface 30 has a shape of trapezoid in which the side closer to the gap layer 18 is longer than the other side. In the medium facing surface 30 the width of the portion of the pole layer 16 touching the gap layer 18 is the track width. The track width is 0.12 µm, for example. The pole layer 16 has a thickness that falls within a range of 0.4 to 0.6 µm inclusive, for example. In the neighborhood of the medium facing surface 30, both sides of the pole layer 16 opposed to each other in the direction of the track width form an angle that falls within a range of 7 to 12 degrees inclusive, for example, with respect to the direction orthogonal to the top surface of the substrate 1. The gap layer 18 has a thickness that falls within a range of 50 to 80 nanometers (nm) inclusive, for example.

The first layer 20A of the shield layer 20 has a first end located in the medium facing surface 30 and a second end opposite to the first end. The second layer 20C of the shield layer 20 also has a first end located in the medium facing surface 30 and a second end opposite to the first end. As shown in FIG. 3, the outermost end of the coil 22 has a shape of circular arc protruding toward the medium facing surface 30. Each of the second end of the first layer 20A and the second end of the second layer 20C has a shape of circular arc along the outermost end of the coil 22.

The second end of the first layer 20A defines the throat height TH. That is, as shown in FIG. 1 and FIG. 3, the throat height TH is the minimum distance between the first end and the second end of the portion of the first layer 20A facing toward the pole layer 16 with the gap layer 18 disposed in between. The throat height TH falls within a range of 0.1 to 0.3 µm inclusive, for example. The minimum distance WS between the first end and the second end of the portion of the second layer 20C facing toward the pole layer 16 with the gap layer 18 and the first layer 20A disposed in between falls within a range of 0.5 to 0.8 µm inclusive, for example. The first layer 20A and the coupling layer 20B have a thickness that falls within a range of 0.3 to 0.5 µm inclusive, for example. The second layer 20C and the coupling layer 20D have a thickness that falls within a range of 2.5 to 3.0 µm inclusive, for example. The third layer 20E has a thickness that falls within a range of 2.0 to 3.0 µm inclusive, for example.

As shown in FIG. 1, the nonmagnetic layer 21 is disposed on a side of the first layer 20A. The nonmagnetic layer 21 has a thickness that is equal to or greater than the thickness of the first layer 20A and that falls within a range of 0.3 to 0.5 µm inclusive, for example. At least part of the coil 22 is disposed on the nonmagnetic layer 21. The coil 22 has a thickness that is equal to or smaller than the thickness of the second layer 20C and that falls within a range of 2.5 to 3.0 µm inclusive, for example. The at least part of the coil 22 is disposed in a region of the nonmagnetic layer 21 that is opposite to the pole layer 16 and farther from the pole layer 16 than a surface (the top surface) of the first layer 20A opposite to the pole layer 16. The nonmagnetic layer 21 preferably has a thermal expansion coefficient lower than that of the insulating layer 22.

Reference is now made to FIG. 4A to FIG. 12A and FIG. 4B to FIG. 12B to describe a method of manufacturing the magnetic head of the embodiment. FIG. 4A to FIG. 12A are cross sections of layered structures obtained through the manufacturing process of the magnetic head, the cross sections being orthogonal to the medium facing surface and the substrate. FIG. 4B to FIG. 12B are cross sections of portions of the layered structures near the medium facing surface that are parallel to the medium facing surface. Portions closer to the substrate 1 than the insulating layer 12 are omitted in FIG. 4A to FIG. 12A and FIG. 4B to FIG. 12B.

According to the method of manufacturing the magnetic head of the embodiment, as shown in FIG. 1, the insulating layer 2, the bottom shield layer 3 and the bottom shield gap film 4 are formed on the substrate 1 one by one. Next, the MR element 5 and a lead not shown that is connected to the MR element 5 are formed on the bottom shield gap film 4. Next, the MR element 5 and the lead are covered with the top shield gap film 6. Next, the top shield layer 7 and the insulating layer 8 are formed one by one on the top shield gap film 6. Next, the coil 9 and the insulating layers 10 and 11 are formed on the insulating layer 8. Next, the top surfaces of the coil 9 and the insulating layers 10 and 11 are flattened by chemical mechanical polishing (CMP), for example. Next, the insulating layer 12 is formed on the flattened top surfaces of the coil 9 and the insulating layers 10 and 11.

Figure 4A:
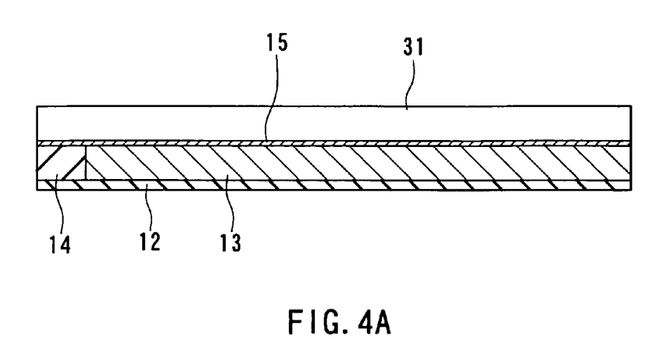
FIG. 4A and FIG. 4B are views for illustrating a step of a method of manufacturing the magnetic head of the first embodiment of the invention.
Figure 4B:
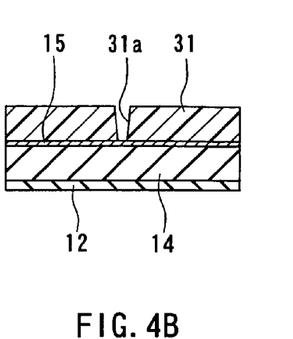

FIG. 4A and FIG. 4B illustrate the following step. In the step, first, the yoke layer 13 having a thickness of 1 µm, for example, is formed by frame plating, for example, on the insulating layer 12. Next, the insulating layer 14 of alumina, for example, is formed on the entire top surface of the layered structure obtained through the foregoing steps. Next, the insulating layer 14 is polished by CMP, for example, so that the yoke layer 13 is exposed, and the top surfaces of the yoke layer 13 and the insulating layer 14 are thereby flattened. Next, the electrode film 15 having a thickness of 50 nm, for example, is formed by sputtering on the top surfaces of the yoke layer 13 and the insulating layer 14. Next, a photoresist layer having a thickness of 1 µm, for example, is formed on the electrode film 15, and the photoresist layer is patterned to form a frame 31 for making the pole layer 16. As shown in FIG. 4B, the frame 31 has a groove 31a having a shape corresponding to the pole layer 16.

Figure 5A:
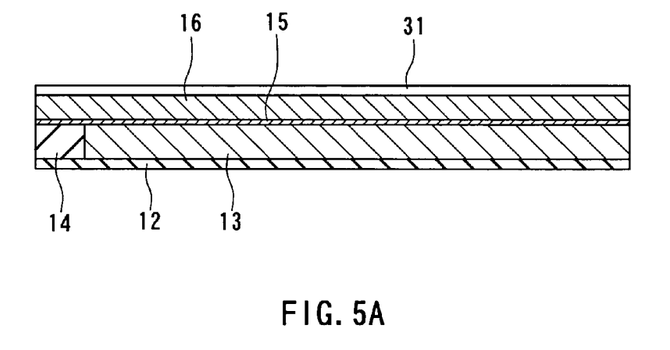
FIG. 5A and FIG. 5B are views for illustrating a step that follows the step shown in FIG. 4A and FIG. 4B.
Figure 5B:
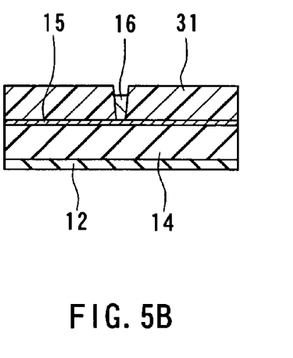

Next, as shown in FIG. 5A and FIG. 5B, the pole layer 16 is formed in the groove 31a of the frame 31 by frame plating. At this time the pole layer 16 has a thickness that falls within a range of 0.5 to 0.9 µm inclusive, for example.

Figure 6A:
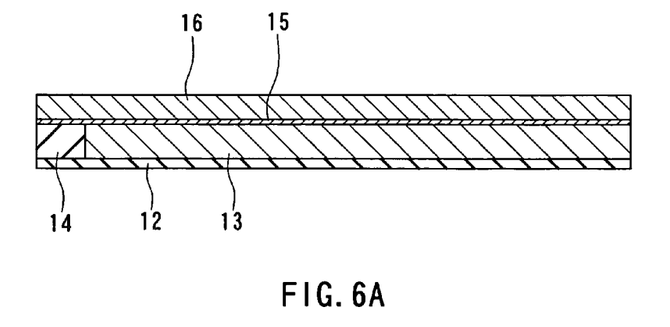
FIG. 6A and FIG. 6B are views for illustrating a step that follows the step shown in FIG. 5A and FIG. 5B.
Figure 6B:
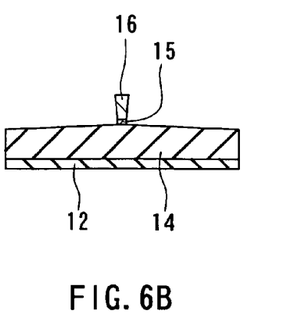

Next, as shown in FIG. 6A and FIG. 6B, the electrode film 15 except a portion located below the pole layer 16 is removed by ion beam etching, for example. Through this etching, a desired thickness of the pole layer 16 is obtained, and a desired track width is obtained. In addition, a desired angle is obtained between the direction orthogonal to the top surface of the substrate 1 and each of the two sides of the pole layer 16 opposed to each other in the direction of the track width.

Instead of forming the pole layer 16 by frame plating, the pole layer 16 may be alternatively formed by making a magnetic layer by sputtering and selectively etching this magnetic layer. Selective etching of the magnetic layer may be performed by, for example, making an alumina layer on the magnetic layer, making a mask on the alumina layer by frame plating, and etching the alumina layer and the magnetic layer using the mask. When the pole layer 16 is formed through such a process, ion milling, for example, is further performed to etch both sides of the pole layer 16 that are opposed to each other in the direction of the track width, so that a desired angle is obtained by each of these sides with respect to the direction orthogonal to the top surface of the substrate 1.

Figure 7A:
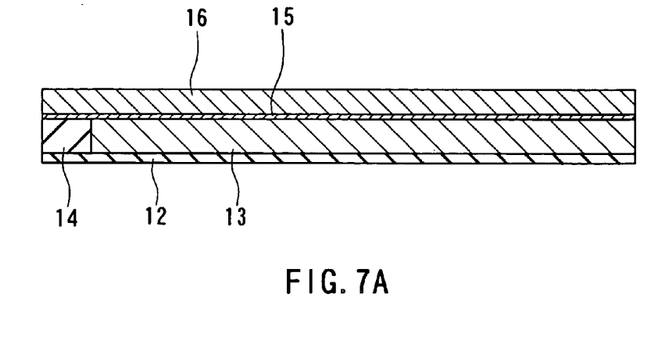
FIG. 7A and FIG. 7B are views for illustrating a step that follows the step shown in FIG. 6A and FIG. 6B.
Figure 7B:
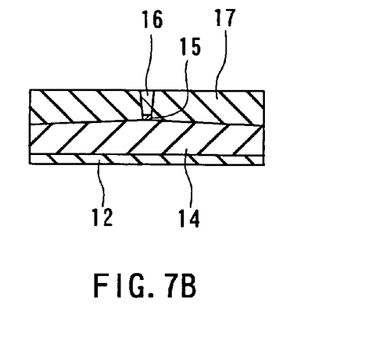

FIG. 7A and FIG. 7B illustrate the following step. In the step, first, the nonmagnetic layer 17 having a thickness equal to the total thickness of the electrode film 15 and the pole layer 16 is formed on the entire top surface of the layered structure. Next, although not shown, a stopper film having a thickness of 10 to 20 nm, for example, is formed on the nonmagnetic layer 17 except a region near the pole layer 16. The stopper film may be made of a nonmagnetic refractory metal such as Ta, Ru or W. Next, an insulating film made of alumina, for example, and having a thickness of 0.5 to 0.8 µm, for example, is formed on the entire top surface of the layered structure. The insulating film is then polished by CMP, for example. This polishing is stopped when the stopper film is exposed. Next, the stopper film is removed by reactive ion etching or wet etching, for example. The top surface of the nonmagnetic layer 17 is thereby exposed. Next, the top surface of the nonmagnetic layer 17 is slightly polished to expose the top surface of the pole layer 16 and to flatten the top surfaces of the pole layer 16 and the nonmagnetic layer 17. The thickness of the pole layer 16 is thereby controlled to be of a desired value.

Figures 8A, 8B:
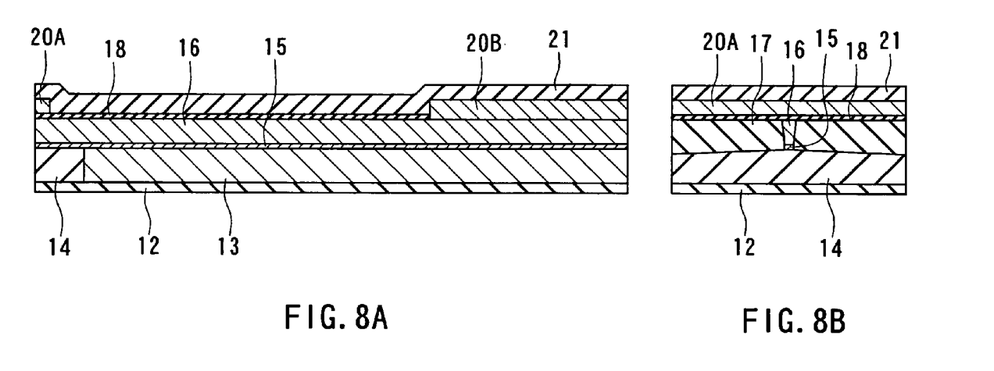
FIG. 8A and FIG. 8B are views for illustrating a step that follows the step shown in FIG. 7A and FIG. 7B.

FIG. 8A and FIG. 8B illustrate the following step. In the step, first, the gap layer 18 is formed on the entire top surface of the layered structure. Next, a portion of the gap layer 18 away from the medium facing surface 30 is selectively etched to form an opening in the gap layer 18. Next, the first layer 20A is formed on the gap layer 18, and the coupling layer 20B is formed on a portion of the pole layer 16 where the opening of the gap layer 18 is formed. The first layer 20A and the coupling layer 20B may be formed by frame plating or by making a magnetic layer through sputtering and then selectively etching the magnetic layer. Selective etching of the magnetic layer may be performed by, for example, making an alumina layer on the magnetic layer, making a mask on the alumina layer by frame plating, and etching the alumina layer and the magnetic layer using the mask. Next, the nonmagnetic layer 21 is formed on the entire top surface of the layered structure.

Figures 9A, 9B:
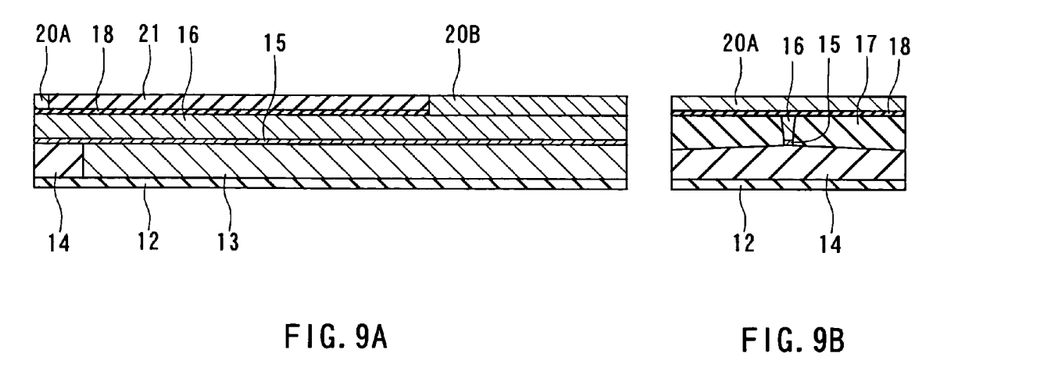
FIG. 9A and FIG. 9B are views for illustrating a step that follows the step shown in FIG. 8A and FIG. 8B.

Next, as shown in FIG. 9A and FIG. 9B, the nonmagnetic layer 21 is polished by CMP, for example, so that the first layer 20A and the coupling layer 20B are exposed, and the top surfaces of the first layer 20A, the coupling layer 20B and the nonmagnetic layer 21 are flattened. Through this polishing, the first layer 20A is made to have a thickness of 0.3 to 0.5 µm, for example.

Figures 10A, 10B:
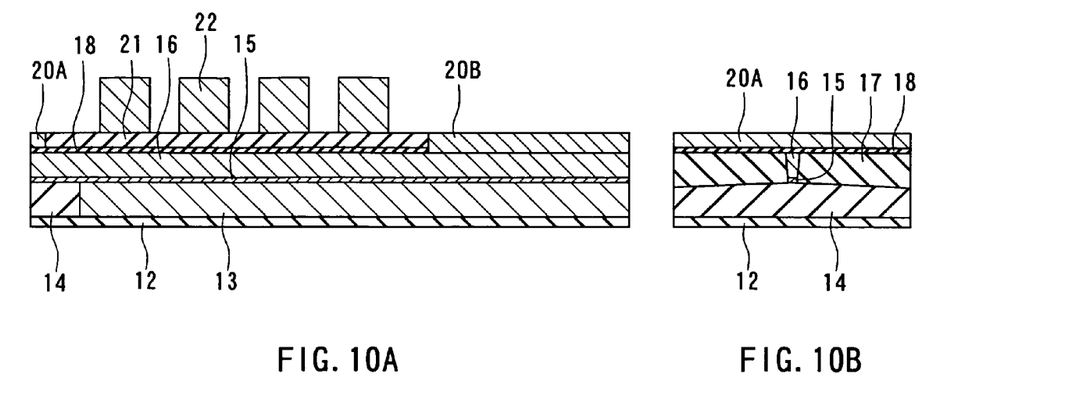
FIG. 10A and FIG. 10B are views for illustrating a step that follows the step shown in FIG. 9A and FIG. 9B.

Next, as shown in FIG. 10A and FIG. 10B, the coil 22 is formed by frame plating, for example, such that at least part of the coil 22 is disposed on the nonmagnetic layer 21.

Figures 11A, 11B:
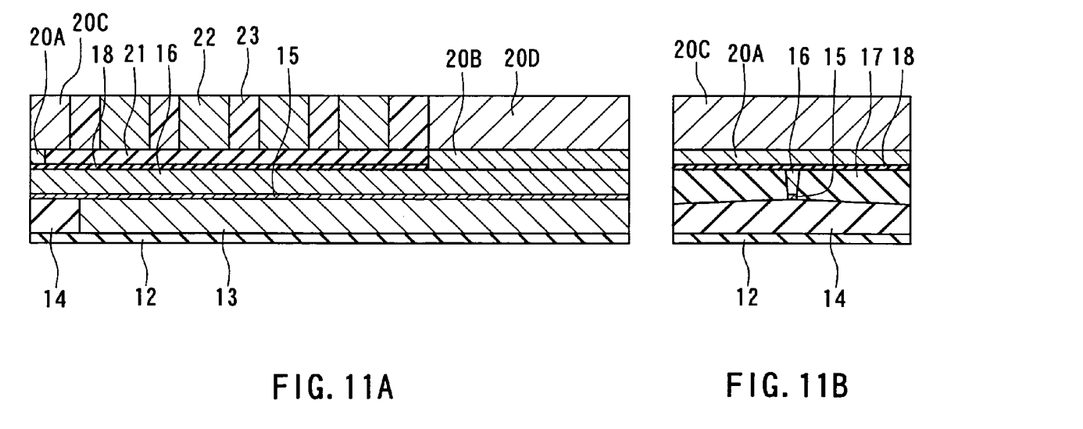
FIG. 11A and FIG. 11B are views for illustrating a step that follows the step shown in FIG. 10A and FIG. 10B.

FIG. 11A and FIG. 11B illustrate the following step. In the step, first, the second layer 20C and the coupling layer 20D are formed by frame plating, for example. Next, the insulating layer 23 made of photoresist, for example, is selectively formed in the space between adjacent ones of the turns of the coil 22 and around the coil 22. Next, although not shown, an insulating film made of alumina, for example, and having a thickness of 4 to 4.5 µm, for example, is formed on the entire top surface of the layered structure. Next, the insulating film is polished by CMP, for example, so that the second layer 20C, the coupling layer 20D and the coil 22 are exposed, and the top surfaces of the second layer 20C, the coupling layer 20D, the coil 22 and the insulating layer 23 are thereby flattened. Alternatively, the coil 22 may be formed after the second layer 20C and the coupling layer 20D are formed.

Figure 12A:
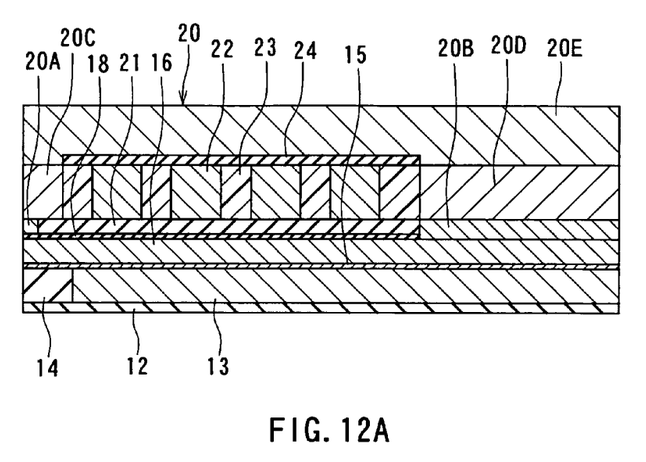
FIG. 12A and FIG. 12B are views for illustrating a step that follows the step shown in FIG. 11A and FIG. 11B.
Figure 12B:
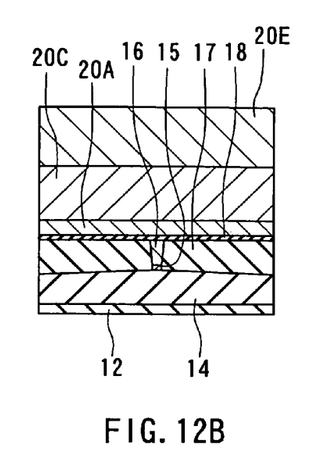

FIG. 12A and FIG. 12B illustrate the following step. In the step, first, the insulating layer 24 is formed on the coil 22 and the insulating layer 23. Next, the third layer 20E is formed by frame plating, for example, to complete the shield layer 20.

Next, although not shown, a protection layer is formed to cover the entire top surface of the layered structure. Wiring and terminals are then formed on the protection layer, the substrate is cut into sliders, and the steps including polishing of the medium facing surface 30 and fabrication of flying rails are performed. The magnetic head is thus completed.

The operation and effects of the magnetic head of the embodiment will now be described. The magnetic head writes data on a recording medium by using the write head and reads data written on the recording medium by using the read head. In the write head the coil 22 generates a magnetic field that corresponds to the data to be written on the medium. The pole layer 16 and the shield layer 20 form a magnetic path through which a magnetic flux corresponding to the magnetic field generated by the coil 22 passes. The pole layer 16 allows the flux corresponding to the field generated by the coil 22 to pass and generates a write magnetic field used for writing the data on the medium through the use of the perpendicular magnetic recording system. The shield layer 20 takes in a disturbance magnetic filed applied from outside the magnetic head to the magnetic head. It is thereby possible to prevent erroneous writing on the recording medium caused by the disturbance magnetic filed intensively taken in the pole layer 16.

According to the embodiment, the throat height TH is defined by the second end of the first layer 20A of the shield layer 20. The nonmagnetic layer 21 is disposed on a side of the first layer 20A. At least part of the coil 22 is disposed in the region of the nonmagnetic layer 21 that is opposite to the pole layer 16 and farther from the pole layer 16 than a surface of the first layer 20A opposite to the pole layer 16. Therefore, according to the embodiment, no coil or insulating layer covering a coil exists on a side of the first layer 20A. It is thereby possible to prevent variation of the first layer 20A when the medium facing surface 30 is polished. As a result, it is possible to define the throat height TH with accuracy. This effect is particularly noticeable when the nonmagnetic layer 21 is made of an inorganic insulating material harder than photoresist. According to the embodiment, it is also possible to prevent an end of the first layer 20A closer to the medium facing surface 30 from protruding because of the heat generated by the coil 22. This effect is particularly noticeable when the nonmagnetic layer 21 has a thermal expansion coefficient lower than that of the insulating layer 23 disposed around the coil 22.

According to the embodiment, the coil 22 and the insulating layer 23 are disposed on a side of the second layer 20C of the shield layer 20. However, because of the following reason, it is possible to prevent protrusion of an end of the second layer 20C closer to the medium facing surface 30 resulting from the heat generated by the coil 22. The minimum distance WS between the first end and the second end of the second layer 20C is greater than the throat height TH, that is, the minimum distance between the first end and the second end of the first layer 20A. In addition, the volume of the second layer 20C is greater than the volume of the first layer 20A. Because of these features, the second layer 20C is harder to vary, compared to the first layer 20A. Furthermore, the volume of the portion of the insulating layer 23 located between the second layer 20C and the coil 22 is smaller than the volume of the insulating layer 105 of FIG. 17. Therefore, according to the embodiment, it is possible to prevent protrusion of the end of the second layer 20C closer to the medium facing surface 30 resulting from the heat generated by the coil 22.

According to the embodiment, in the medium facing surface 30, the end of the shield layer 20 is disposed forward of the end of the pole layer 16 along the direction T of travel of the recording medium (that is, on the air-outflow-end side of the slider) with a specific small space created by the gap layer 18. The location of an end of the bit pattern written on the recording medium is determined by the location of the end of the pole layer 16 that is closer to the gap layer 18 and located in the medium facing surface 30. The shield layer 20 takes in a magnetic flux generated from the end of the pole layer 16 located in the medium facing surface 30 and extending in directions except the direction orthogonal to the surface of the recording medium so as to prevent the flux from reaching the recording medium. It is thereby possible to prevent a direction of magnetization of the bit pattern already written on the medium from being changed due to the effect of the above-mentioned flux. According to the embodiment, an improvement in linear recording density is thus achieved.

According to the embodiment, as shown in FIG. 2, the end of the pole layer 16 located in the medium facing surface 30 has a shape of trapezoid in which the side closer to the gap layer 18 is longer than the other side. It is thereby possible to prevent the problems resulting from the skew.

According to the embodiment, the flat-whorl-shaped coils 9 and 22 may be replaced with coils wound in a helical manner around the yoke layer 13 and the pole layer 16.

Second Embodiment

Figure 13A:
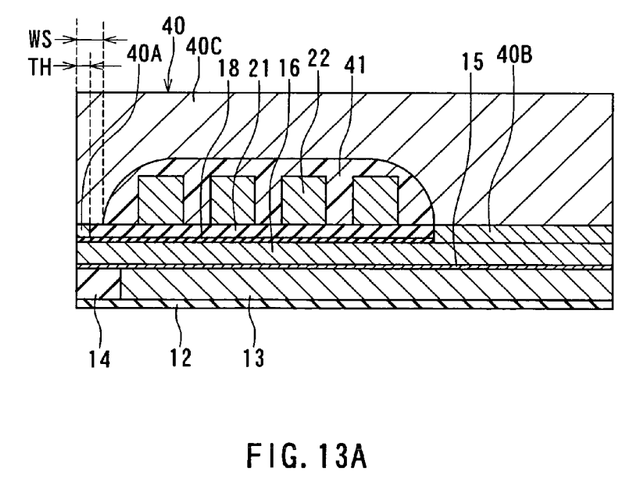
FIG. 13A and FIG. 13B are cross-sectional views for illustrating the main part of a magnetic head of a second embodiment of the invention.
Figure 13B:
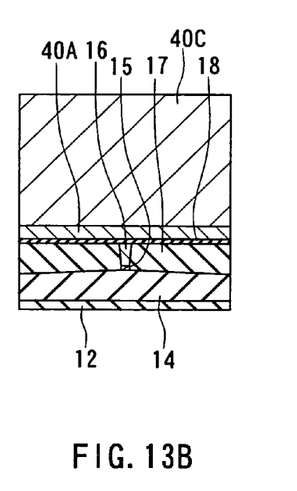

Reference is now made to FIG. 13A and FIG. 13B to describe a magnetic head and a method of manufacturing the same of a second embodiment of the invention. FIG. 13A is a cross section of the main part of the magnetic head orthogonal to the medium facing surface and the substrate. FIG. 13B is a cross section of a portion of the main part of the magnetic head near the medium facing surface that is parallel to the medium facing surface.

According to the second embodiment, the magnetic head comprises an insulating layer 41 covering the at least part of the coil in place of the insulating layers 23 and 24 of the first embodiment. According to the second embodiment, the magnetic head comprises a shield layer 40 in place of the shield layer 20 of the first embodiment. The shield layer 40 has a first layer 40A, a coupling layer 40B and a second layer 40C. The first layer 40A has a first end located in the medium facing surface 30 and a second end opposite to the first end, as the first layer 20A of the first embodiment. The nonmagnetic layer 21 is disposed on a side of the first layer 40A. As the coupling layer 20B of the first embodiment, the coupling layer 40B is disposed on the portion of the pole layer 16 where the opening of the gap layer 18 is formed. The second layer 40C has an end located in the medium facing surface 30 and couples the first layer 40A to the coupling layer 40B. The second layer 40C includes a portion located on a side of the at least part of the coil 22 opposite to the pole layer 16, the at least part of the coil 22 being covered with the insulating layer 41. As shown in FIG. 13A, the second layer 40C has a portion located between the medium facing surface 30 and the coil 22, and the distance between an end of the portion closer to the medium facing surface 30 and the other end thereof increases as the distance from the first layer 40A increases.

In FIG. 13A 'TH' indicates the throat height that is the minimum distance between the first end and the second end of the first layer 40A. 'WS' indicates the minimum distance between the end closer to the medium facing surface 30 and the other end of the portion of the second layer 40C located between the medium facing surface 30 and the coil 22.

The first layer 40A, the coupling layer 40B and the second layer 40C are made of CoNiFe, for example. The insulating layer 41 is made of photoresist, for example. The nonmagnetic layer 21 preferably has a thermal expansion coefficient smaller than that of the insulating layer 41.

The method of manufacturing the magnetic head of the second embodiment includes the steps up to the step of forming the coil 22 that are the same as those of the first embodiment. According to the second embodiment, the insulating layer 41 and the second layer 40C are then formed one by one, and the shield layer 40 is thereby completed. The steps that follow are the same as those of the first embodiment.

According to the second embodiment, the distance between the end closer to the medium facing surface 30 and the other end of the portion of the second layer 40C located between the medium facing surface 30 and the coil 22 increases as the distance from the first layer 40A increases. Therefore, the cross-sectional area of the magnetic path formed by the second layer 40C gradually decreases as the distance from the first layer 40A decreases. As a result, it is possible to prevent saturation of magnetic flux halfway through the magnetic path formed by the second layer 40C.

The remainder of configuration, function and effects of the second embodiment are similar to those of the first embodiment.

Third Embodiment

Reference is now made to FIG. 14A to FIG. 16A and FIG. 14B to FIG. 16B to describe a method of manufacturing a magnetic head of a third embodiment of the invention. FIG. 14A to FIG. 16A are cross sections of layered structures obtained in the course of the manufacturing process orthogonal to the medium facing surface and the substrate. FIG. 14B to FIG. 16B are cross sections of portions of the layered structures near the medium facing surface that are parallel to the medium facing surface. Portions closer to the substrate 1 than the insulating layer 12 are omitted in FIG. 14A to FIG. 16A and FIG. 14B to FIG. 16B.

The method of manufacturing the magnetic head of the third embodiment includes the steps up to the step of forming the first layer 20A and the coupling layer 20B that are the same as those of the first embodiment.

Figure 14A:
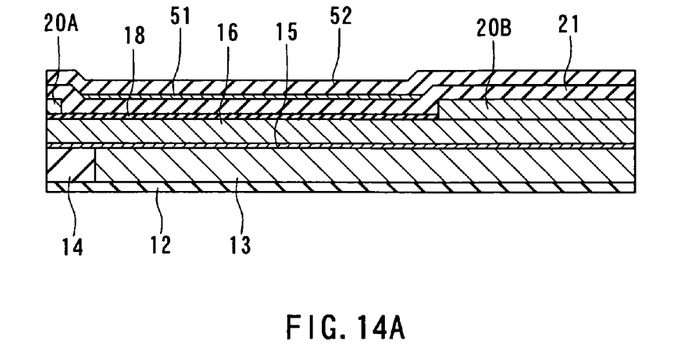
FIG. 14A and FIG. 14B are views for illustrating a step of a method of manufacturing a magnetic head of a third embodiment of the invention.
Figure 14B:
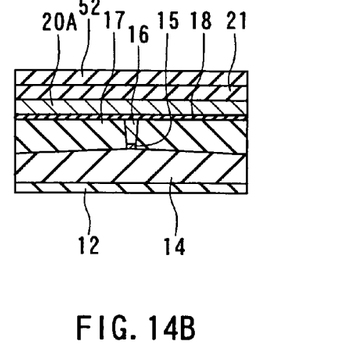

FIG. 14A and FIG. 14B illustrate the following step. In the step the nonmagnetic layer 21 is first formed on the entire top surface of the layered structure, wherein the nonmagnetic layer 21 is formed to have a thickness equal to the thickness of the first layer 20A. Next, a stopper film 51 having a thickness of 20 to 30 nm, for example, is formed on the nonmagnetic layer 21 except regions near the first layer 20A and the coupling layer 20B. The stopper film 51 may be made of a nonmagnetic refractory metal such as Ta, Ru or W. Next, an insulating film 52 made of alumina, for example, and having a thickness of 0.5 to 0.8 μm, for example, is formed on the entire top surface of the layered structure.

Figure 15A:
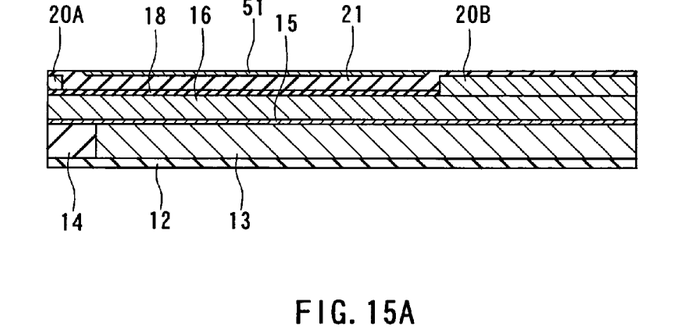
FIG. 15A and FIG. 15B are views for illustrating a step that follows the step shown in FIG. 14A and FIG. 14B.
Figure 15B:
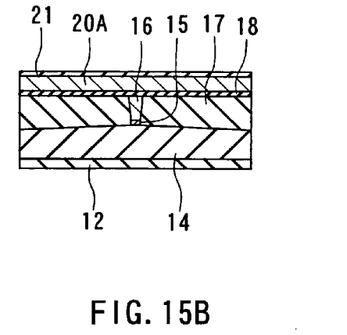

Next, as shown in FIG. 15A and FIG. 15B, the insulating film 52 is polished by CMP, for example. This polishing is stopped when the stopper film 51 is exposed.

Figure 16A:
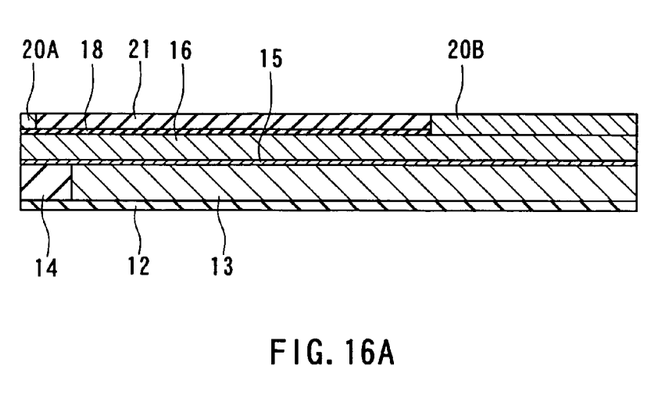
FIG. 16A and FIG. 16B are views for illustrating a step that follows the step shown in FIG. 15A and FIG. 15B.
Figure 16B:
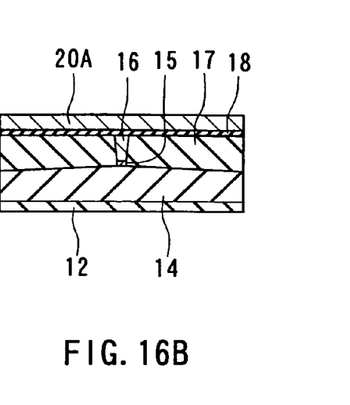

FIG. 16A and FIG. 16B illustrate the following step. In the step, first, the stopper film 51 is removed by reactive ion etching or wet etching, for example. Next, the top surface of the nonmagnetic layer 21 is slightly polished by CMP, for example, to expose the first layer 20A and the coupling layer 20B and to flatten the top surfaces of the first layer 20A, the coupling layer 20B and the nonmagnetic layer 21. The thickness of the first layer 20A is thereby controlled to be of a desired value. The steps that follow are the same as those of the first or second embodiment.

Alternatively, in the third embodiment, after the stopper film 51 is exposed and polishing of the insulating film 52 is stopped, the stopper film 51 may be removed and the top surfaces of the first layer 20A, the coupling layer 20B and the nonmagnetic layer 21 may be flattened by CMP using a polisher capable of polishing the stopper film 51, the first layer 20A, the coupling layer 20B and the nonmagnetic layer 21.

In the third embodiment, the total thickness of the nonmagnetic layer 21 and the stopper film 51 may be equal to the thickness of the first layer 20A at a point in time when the stopper film 51 has been formed. In this case, at a point when the stopper film 51 is exposed and polishing of the insulating film 52 is stopped, the first layer 20A and the coupling layer 20B are exposed and a desired thickness of the first layer 20A is obtained. In this case, a small portion of the stopper film 51 may remain on the nonmagnetic layer 21. However, if the stopper film 51 is made of a conductive material, an insulating film should be formed on the stopper film 51 so as to form the coil 22 on the insulating film.

The remainder of configuration, function and effects of the third embodiment are similar to those of the first or second embodiment.

The present invention is not limited to the foregoing embodiments but may be practiced in still other ways. For example, in the foregoing embodiments, the magnetic head is disclosed, having such a configuration that the read head is formed on the base body and the write head is stacked on the read head. Alternatively, the read head may be stacked on the write head.

Obviously many modifications and variations of the present invention are possible in the light of the above teachings. It is therefore to be understood that within the scope of the appended claims the invention may be practiced otherwise than as specifically described.

What is claimed is:

1. A magnetic head for perpendicular magnetic recording comprising:
    a medium facing surface that faces toward a recording medium;
    a coil for generating a magnetic field corresponding to data to be written on the recording medium;
    a pole layer having an end located in the medium facing surface, allowing a magnetic flux corresponding to the field generated by the coil to pass therethrough, and generating a write magnetic field for writing the data on the recording medium through the use of a perpendicular magnetic recording system;
    a shield layer having an end located in the medium facing surface, a portion of the shield layer away from the medium facing surface being coupled to the pole layer; and
    a gap layer made of a nonmagnetic material and provided between the pole layer and the shield layer, wherein:
    in the medium facing surface, the end of the shield layer is disposed forward of the end of the pole layer along a direction of travel of the recording medium with a specific space created by a thickness of the gap layer;
    at least part of the coil is disposed between the pole layer and the shield layer and insulated from the pole layer and the shield layer;
    the shield layer incorporates: a first layer disposed adjacent to the gap layer; and a second layer disposed on a side of the first layer opposite to the gap layer;
    the first layer has a first end located in the medium facing surface and a second end opposite to the first end, the second end defining a throat height;
    the magnetic head further comprises a nonmagnetic layer made of a nonmagnetic material and disposed on a side of the first layer; and
    the at least part of the coil is disposed in a region of the nonmagnetic layer that is opposite to the pole layer and farther from the pole layer than a surface of the first layer opposite to the pole layer.

2. The magnetic head according to claim 1, wherein the end of the pole layer located in the medium facing surface has a shape of trapezoid in which a side closer to the gap layer is longer than the other side.

3. The magnetic head according to claim 1, wherein the nonmagnetic layer is made of an inorganic insulating material.

4. The magnetic head according to claim 1, wherein:
    the second layer is disposed between the medium facing surface and the at least part of the coil;
    the magnetic head further comprises an insulating layer disposed around the at least part of the coil;
    each of the second layer, the at least part of the coil and the insulating layer has a flattened surface that is located opposite to the pole layer; and
    the shield layer further incorporates a third layer that is connected to the second layer and located on a side of the at least part of the coil opposite to the nonmagnetic layer.

5. The magnetic head according to claim 4, wherein the nonmagnetic layer has a thermal expansion coefficient lower than that of the insulating layer.

6. The magnetic head according to claim 1, further comprising an insulating layer covering the at least part of the coil, wherein the second layer includes a portion located on a side of the at least part of the coil opposite to the pole layer.

7. The magnetic head according to claim 6, wherein the nonmagnetic layer has a thermal expansion coefficient smaller than that of the insulating layer.

8. The magnetic head according to claim 1, wherein a distance between an end closer to the medium facing surface and the other end of a portion of the second layer, the portion located between the medium facing surface and the at least part of the coil, increases as a distance from the first layer increases.

9. A method of manufacturing a magnetic head for perpendicular magnetic recording comprising:
- a medium facing surface that faces toward a recording medium;
- a coil for generating a magnetic field corresponding to data to be written on the recording medium;
- a pole layer having an end located in the medium facing surface, allowing a magnetic flux corresponding to the field generated by the coil to pass therethrough, and generating a write magnetic field for writing the data on the recording medium through the use of a perpendicular magnetic recording system;
- a shield layer having an end located in the medium facing surface, a portion of the shield layer away from the medium facing surface being coupled to the pole layer; and
- a gap layer made of a nonmagnetic material and provided between the pole layer and the shield layer, wherein:
- in the medium facing surface, the end of the shield layer is disposed forward of the end of the pole layer along a direction of travel of the recording medium with a specific space created by a thickness of the gap layer;
- at least part of the coil is disposed between the pole layer and the shield layer and insulated from the pole layer and the shield layer;
- the shield layer incorporates: a first layer disposed adjacent to the gap layer; and a second layer disposed on a side of the first layer opposite to the gap layer;
- the first layer has a first end located in the medium facing surface and a second end opposite to the first end, the second end defining a throat height, the method comprising the steps of
  - forming the pole layer;
  - forming the gap layer on the pole layer;
  - forming the first layer on the gap layer;
  - forming a nonmagnetic layer made of a nonmagnetic material and disposed on a side of the first layer;
  - forming the coil such that the at least part of the coil is disposed in a region of the nonmagnetic layer that is opposite to the pole layer and farther from the pole layer than a surface of the first layer opposite to the pole layer; and
  - forming the second layer on the first layer.

10. The method according to claim 9, wherein the end of the pole layer located in the medium facing surface is made to have a shape of trapezoid in which a side closer to the gap layer is longer than the other side.

11. The method according to claim 9, wherein the nonmagnetic layer is made of an inorganic insulating material.

12. The method according to claim 9, wherein:
- the second layer is disposed between the medium facing surface and the at least part of the coil;
- the shield layer is made to further incorporate a third layer that is connected to the second layer and located on a side of the at least part of the coil opposite to the nonmagnetic layer,
- the method further comprising the steps of forming an insulating layer disposed around the at least part of the coil; flattening a top surface of each of the second layer, the at least part of the coil, and the insulating layer; and forming the third layer.

13. The method according to claim 12, wherein the nonmagnetic layer is made to have a thermal expansion coefficient lower than that of the insulating layer.

14. The method according to claim 9, further comprising the step of forming an insulating layer covering the at least part of the coil, wherein
- the second layer is made to include a portion located on a side of the at least part of the coil opposite to the pole layer.

15. The magnetic head according to claim 14, wherein the nonmagnetic layer is made to have a thermal expansion coefficient smaller than that of the insulating layer.

16. The method according to claim 9, wherein a distance between an end closer to the medium facing surface and the other end of a portion of the second layer, the portion located between the medium facing surface and the at least part of the coil, is made to increase as a distance from the first layer increases.

* * * * *